United States Patent
Coralic et al.

(10) Patent No.: US 10,494,088 B1
(45) Date of Patent: Dec. 3, 2019

(54) DEPLOYABLE PROPELLER BLADES FOR AERIAL VEHICLES

(71) Applicant: Amazon Technologies, Inc., Seattle, WA (US)

(72) Inventors: Vedran Coralic, Seattle, WA (US); Cyriel Notteboom, Cambridge (GB); David Moro Ludena, Madrid (ES)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/680,887

(22) Filed: Aug. 18, 2017

(51) Int. Cl.
*B64C 27/10* (2006.01)
*B64C 39/02* (2006.01)
*B64C 27/14* (2006.01)
*B64C 27/82* (2006.01)

(52) U.S. Cl.
CPC .............. *B64C 27/10* (2013.01); *B64C 27/14* (2013.01); *B64C 27/82* (2013.01); *B64C 39/024* (2013.01); *B64C 2027/8236* (2013.01)

(58) Field of Classification Search
CPC ......... B64C 27/08; B64C 27/10; B64C 27/14; B64C 27/82; B64C 39/024; B64C 2027/8236
See application file for complete search history.

(56) References Cited

U.S. PATENT DOCUMENTS

| | | | | |
|---|---|---|---|---|
| 3,625,631 | A  * | 12/1971 | Covington, Jr. ........ | B64C 27/50 416/1 |
| 7,789,341 | B2 * | 9/2010 | Arlton ..................... | B64C 27/10 244/17.23 |
| 9,434,471 | B2 * | 9/2016 | Arlton ..................... | B64C 27/14 |
| 10,054,939 | B1 * | 8/2018 | Applewhite .............. | B64F 1/04 |
| 10,106,252 | B1 * | 10/2018 | Tearne .................... | B64C 27/50 |
| 10,293,957 | B2 * | 5/2019 | Zhang ....................... | B64F 1/04 |
| 2008/0245924 | A1* | 10/2008 | Arlton ................... | B64C 39/024 244/17.13 |
| 2016/0122013 | A1* | 5/2016 | Thompson .............. | B64C 27/50 416/1 |
| 2016/0167778 | A1* | 6/2016 | Meringer ................ | B64C 27/10 244/17.23 |
| 2017/0259183 | A1* | 9/2017 | Matloff .................. | A63H 27/12 |
| 2019/0092461 | A1* | 3/2019 | Duffy ..................... | B64C 11/04 |

* cited by examiner

*Primary Examiner* — Sizo B Vilakazi
(74) *Attorney, Agent, or Firm* — Athorus, PLLC (57) ABSTRACT

Aerial vehicles may be equipped with propellers having pivotable blades that are configured to rotate when the propellers are not rotating under power. A pivotable blade may rotate about an axis of a propeller with respect to a hub until the pivotable blade is coaligned with a fixed blade. When the propeller is rotating a lifting force from the blade may cause the blade to rotate to a deployed position that is not coaligned with the fixed blade.

20 Claims, 12 Drawing Sheets

DEPLOYABLE PROPELLER BLADES FOR AERIAL VEHICLES

BACKGROUND

Many unmanned aerial vehicles include multiple motors, each having one or more propellers for generating forces in a given direction, typically in a direction corresponding to an axis of the motor, about which the propeller rotates. Many unmanned aerial vehicles feature two, four, eight or other numbers of motors and propellers to provide forces of lift and/or thrust in any number of directions. The motors and propellers may be operated independently or in concert with one another, on an as-needed or an as-desired basis. For example, because the availability of excess lift is most essential during take-off and landing (or vertical) evolutions of an unmanned aerial vehicle, multi-rotor unmanned aerial vehicles are commonly equipped with greater lift capacity than is commonly required during most transiting (or forward) operations, in order to ensure that excess lift is available when needed, primarily during take-offs or landings.

In order to conserve onboard electrical power when force is neither desired nor required from each of the motors provided aboard an unmanned aerial vehicle, one or more of the motors may be shut down from time to time, such as when the unmanned aerial vehicle is transiting, or operating in a thrust mode, or other modes in which force in a direction of a motor axis is not required. One or more of the motors may be restarted when the unmanned aerial vehicle prepares to land at a given location, or otherwise requires force in a direction of a motor axis.

A propeller that is at rest on an in-flight unmanned aerial vehicle may create undesirable drag and restrict the stability of the unmanned aerial vehicle during transiting operations. Where a propeller at rest is aligned normal to a direction of wind flow, the propeller may naturally align in a direction parallel to that of the wind flow, or be urged into that direction, thereby reducing the extent of drag created by the propeller. Where a propeller at rest is not aligned normal to the direction of wind flow, however, drag created by the propeller may be substantial.

DETAILED DESCRIPTION

As is set forth in greater detail below, the present disclosure is directed to propulsion units having motors and propellers. The propellers include one or more blades that are mounted to hubs in a manner that enables one or more of the blades and hubs of the propeller to pivot about a shaft of the motor when the propellers are not rotating so that the blades may be aligned with a direction of travel, thereby reducing drag from the propeller blades. When the motor begins to rotate the propeller, lifting force generated by the blades of the propeller cause the one or more blades to return to a deployed or operating position with respect to the other blades of the propeller.

Referring to FIGS. 1A through 1D, an aerial vehicle 110 having a plurality of propellers in accordance with implementations of the present disclosure is shown. The aerial vehicle 110 includes a control system 112 and a frame 115 having a plurality of motors 120-1, 120-2, 120-3, 120-4, 120-5, 120-6 mounted thereto. The frame 115 includes a plurality of control surfaces and/or other structural components of the aerial vehicle 110. Each of the plurality of motors 120-1, 120-2, 120-3, 120-4, 120-5, 120-6 is mounted to the frame 115 and forms a propulsion unit with one of a plurality of propellers (or rotors) 130-1, 130-2, 130-3, 130-4, 130-5, 130-6 that is rotatably coupled thereto.

Figure 1A:
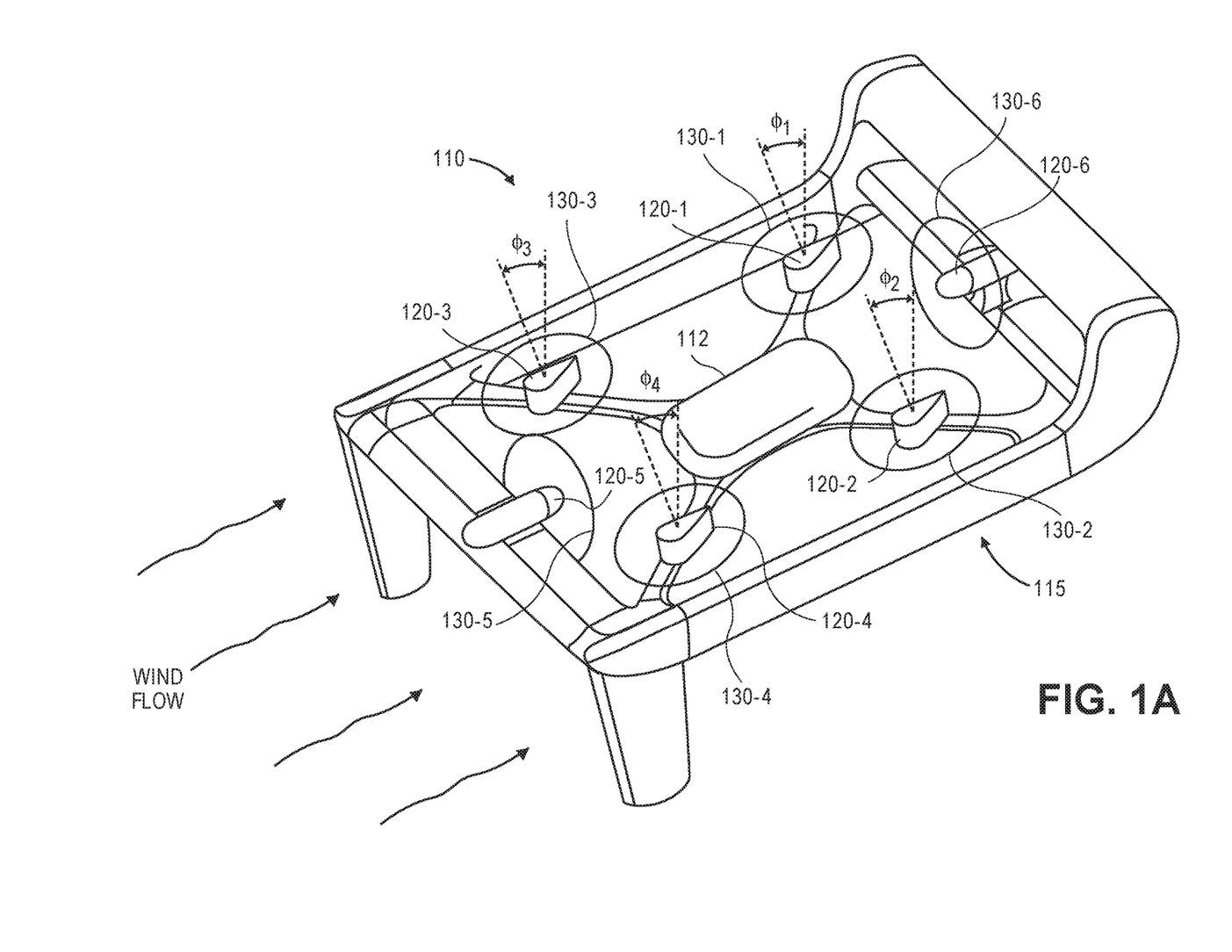
FIGS. 1A through 1D are views of an unmanned aerial vehicle having a plurality of propellers in accordance with implementations of the present disclosure.

The control system 112 is mounted in association with the frame 115 and may include one or more processors, computer devices, memory components and/or transceivers, as necessary. The control system 112 may operate one or more electronic speed controls, power supplies, navigation systems and/or payload engagement controllers for controlling the operation of the aerial vehicle 110, e.g., by one or more control signals. For example, the control system 112 may be configured to cause or control the operation of one or more of the motors 120-1, 120-2, 120-3, 120-4, 120-5, 120-6 or the propellers 130-1, 130-2, 130-3, 130-4, 130-5, 130-6. For example, the control system 112 may send instructions that cause the motors 120-1, 120-2, 120-3, 120-4, 120-5, 120-6 to rotate the propellers 130-1, 130-2, 130-3, 130-4, 130-5, 130-6 at a desired revolutions per minute ("RPM") in order to guide the aerial vehicle 110 along a determined or desired flight path. The control system 112 may further control any aspects of the aerial vehicle 110, including but not limited to one or more control surfaces such as wings, rudders, ailerons, elevators, flaps, brakes, slats or other features of the aerial vehicle 110 within desired ranges.

The motors 120-1, 120-2, 120-3, 120-4, 120-5, 120-6 may be any type of motor (e.g., an electric, gasoline-powered or any other type of motor) capable of generating sufficient rotational speeds of the corresponding propellers 130-1, 130-2, 130-3, 130-4, 130-5, 130-6, to provide lift and/or thrust forces to the aerial vehicle 110 and any engaged payload. For example, in some implementations, one or more of the motors 120-1, 120-2, 120-3, 120-4, 120-5, 120-6 may include a brushless direct current (DC) motor such as an outrunner brushless motor or an inrunner brushless motor.

The motors 120-1, 120-2, 120-3, 120-4 are configured to rotate the propellers 130-1, 130-2, 130-3, 130-4 about axes that are aligned at angles $\phi_1$, $\phi_2$, $\phi_3$, $\phi_4$, with respect to normal to a direction of wind flow. The motors 120-5, 120-6 are aligned to rotate the propellers 130-5, 130-6 about axes that are parallel to the direction of wind flow, e.g., in a forward or aft direction, or parallel to a forward orientation of the aerial vehicle 110.

Figure 1B:
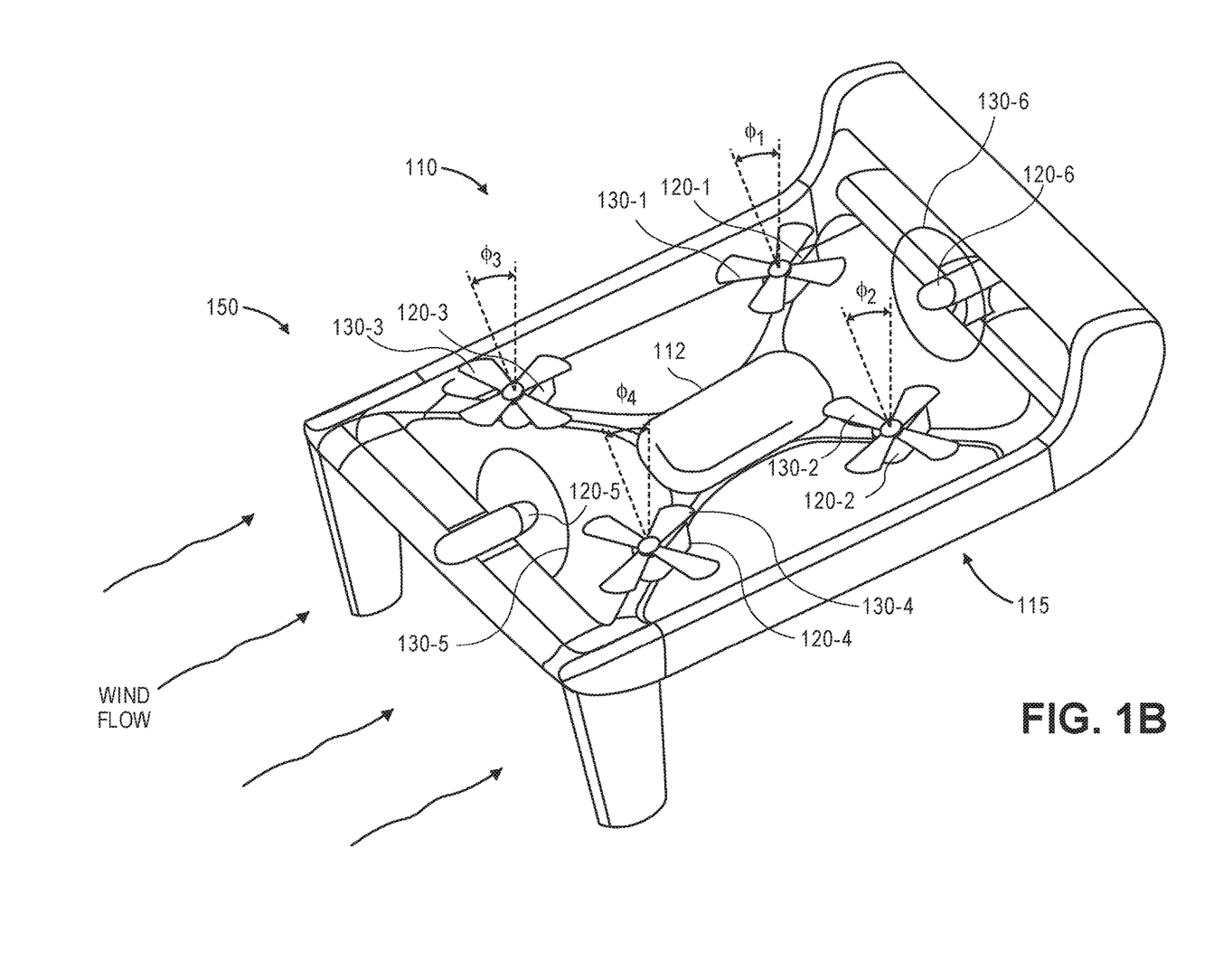

As is shown in FIG. 1A, the aerial vehicle 110 is engaged in flight operations with each of the motors 120-1, 120-2, 120-3, 120-4, 120-5, 120-6 rotating each of the propellers 130-1, 130-2, 130-3, 130-4, 130-5, 130-6 about their respective axes of rotation, viz., angles $\phi_1$, $\phi_2$, $\phi_3$, $\phi_4$ for propellers 130-1, 130-2, 130-3, 130-4 and parallel to the direction of wind flow for the propellers 130-5, 130-6. As is shown in FIG. 1B, the motors 120-5, 120-6 remain in operation, e.g., with the aerial vehicle 110 engaged in forward flight, while the motors 120-1, 120-2, 120-3, 120-4 have been stopped.

In accordance with some implementations of the present disclosure, propellers may include blades that are coupled to a hub and affixed to the shaft of the motor that rotates the propeller and hub assembly. Likewise, the propeller may include blades coupled to hubs that that are pivotable (or rotatable) with respect to their positions about the shaft and with respect to other blade and hub assemblies of the propeller. For example, when a propeller is not rotating, a pivotable blade and hub assembly, which may include one, two, or more blades, of the propeller may be configured to pivot or rotate with respect to an axis of rotation of the propeller, and be repositioned substantially in coalignment with the blade(s) of the propeller that are not so configured, e.g., are coupled to the shaft of the motor.

Figure 1C:
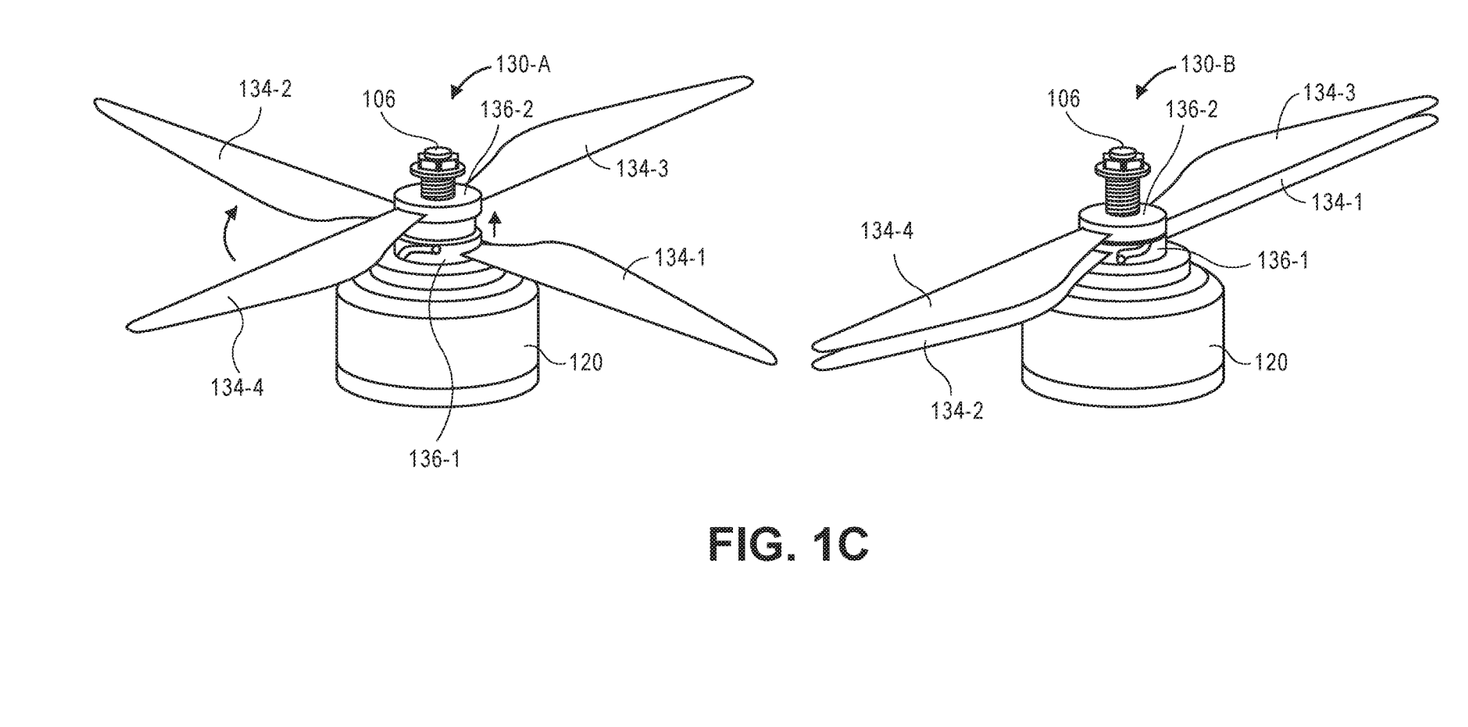

As is shown in FIG. 1C, the propeller 130 includes a first blade 134-1 and a second blade 134-2 mounted to a first hub 136-1, referred to herein as the first blade and hub assembly. The first hub 136-1 is mounted to and rotated by the shaft 106 of the motor 120-3. The third blade 134-3 and the fourth blade are mounted to a second hub 136-2, referred to herein as the second blade and hub assembly. The second hub 136-2 is mated with the first hub 136-1 and is configured to pivot or rotate independently with respect to the shaft 106, about the axis of rotation of the propeller 130, when the motor 120 is not operating. In this example, and as discussed further below, the first hub 136-1 includes a groove on the interior of the hub. The second hub 136-2 fits within an interior of the first hub and includes a pin that fits within the groove of the first hub, thereby allowing the second hub 135-2 to rotate independent of the shaft 106 between a deployed or operational position, as illustrated by propeller 130-A and a coaligned or stacked position, as illustrated by propeller 130, in which the two pairs of propeller blades are coaxially aligned.

As discussed further below, the hubs may be affixed to the motor 120 by a spring and prop nut. The spring applies a downward force on the second hub 136-2 that causes the pin to move along or within the guide, slot, or groove of the first hub 136-1, depending upon the rotational force of the motor 120 and the resulting lifting force generated by the blades 134-3 and 134-4 coupled to the second hub 136-2.

When the propeller 130 is caused to rotate by the motor 120, lifting forces generated by the rotation of the third blade 134-4 and the fourth blade 134-4 coupled to the second hub 136-2 exceed the force generated by the spring and cause the second blade and hub assembly to rotate into a deployed or operating position. When the rotation of the motor 120-3 is stopped, however, the forces of the spring exceed the lifting forces generated the blades 134-3 and 134-4 and the second blade and hub assembly rotates back to the coaligned position and the blades 134-3 and 134-4 align with the first blade 134-1 and 134-2, respectively. With the blades in this coaligned position, such that the blades are vertically stacked, the coaligned blades may be rotated by the motor to be positioned parallel to the wind flow and direction of travel of the vehicle, thereby reducing the drag produced by the blades.

Figure 1D:
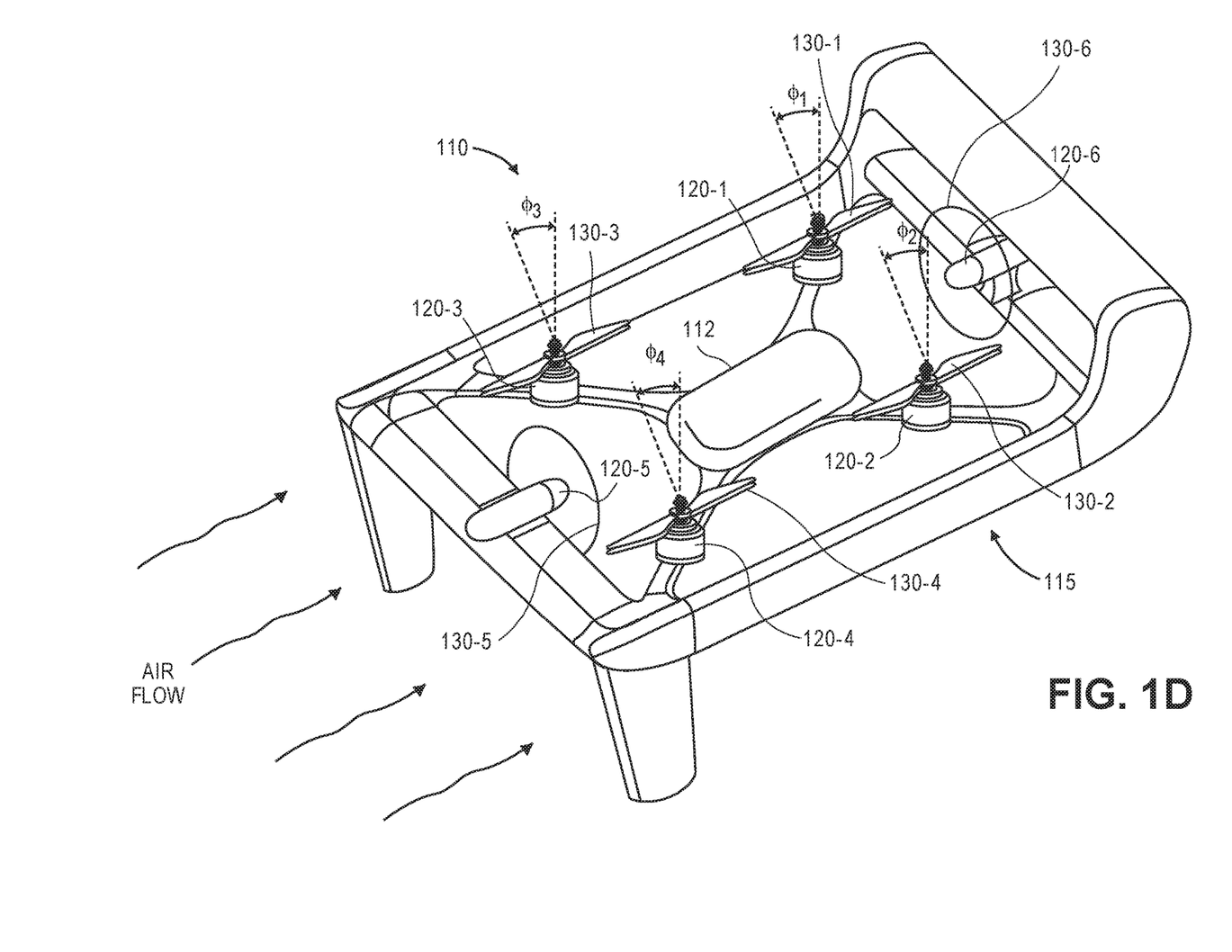

As is shown in FIG. 1D, the aerial vehicle 110 is engaged in a forward-flight operation, e.g., with the motors 120-5, 120-6 operating, and with the motors 120-1, 120-2, 120-3, 120-4 stopped. Thus, the propellers 130-1, 130-2, 130-3, and 130-4 are shown with the four blades of each propeller coaligned in a paired configuration and oriented parallel to a direction of travel of the aerial vehicle 110. The configurations of the propellers 130-1, 130-2, 130-3, 130-4 thus reduces the extent of drag created by such propellers when the motors 120-1, 120-2, 120-3, 120-4 are not operating.

Accordingly, implementations of the systems and methods disclosed herein may include propulsion units having propellers with one or more blade and hub assemblies that may be repositioned with respect to other blade and hub assemblies of the propeller when the propeller is not rotating under power.

Although each hub of the propellers 130-1, 130-2, 130-3, 130-4 are shown as including a pair of blades, the propulsion units of the present disclosure may feature propellers having one or more blades coupled to each hub of the propeller and each propeller may have two or more hubs, one of which is mounted or coupled to the shaft of the motor and one or more of which are independently rotatable about the shaft. For example, referring to FIG. 1C, which shows the second hub 136-2, third blade 134-3 and fourth blade 134-4 pivoting approximately ninety degrees (90°) about an axis of the propeller 130, from a position in which each of the four blades 134-1, 134-2, 134-3, and 134-4 are approximately equally spaced about the propeller and in a normal operating configuration, to a collapsed or coaligned position in which the first blade 134-1 and third blade 134-3 are coaxially aligned and in a stacked configuration and the second blade 134-2 and fourth blade 134-4 are coaxially aligned and in a stacked configuration. Any number of blade and hub assemblies and any amount of pivot or rotation may be utilized in accordance with the present disclosure.

Figure 2:
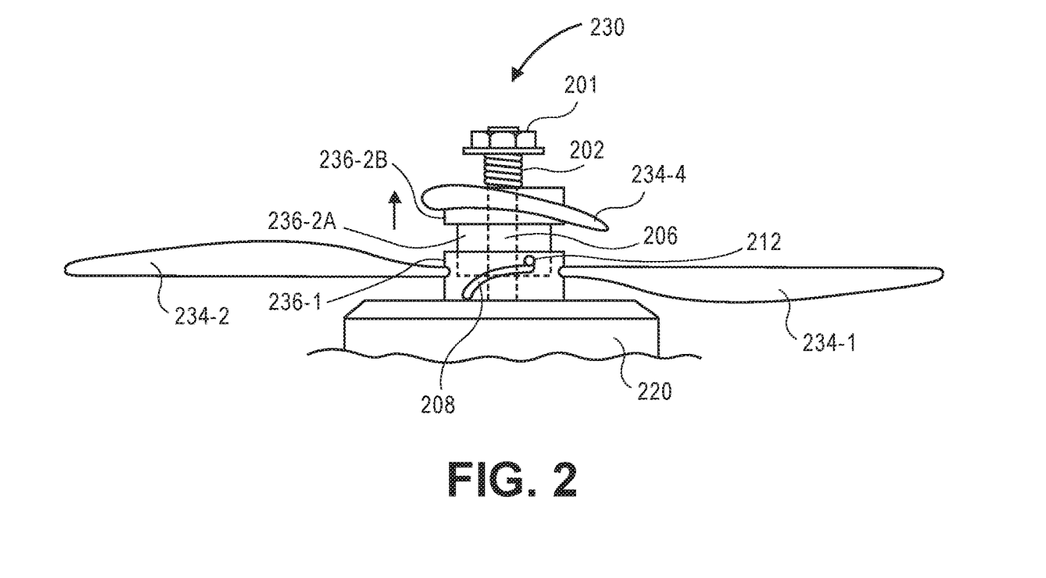
FIGS. 2 through 3 are a side views of a four-blade propeller, in accordance with implementations of the present disclosure.
Figure 3:
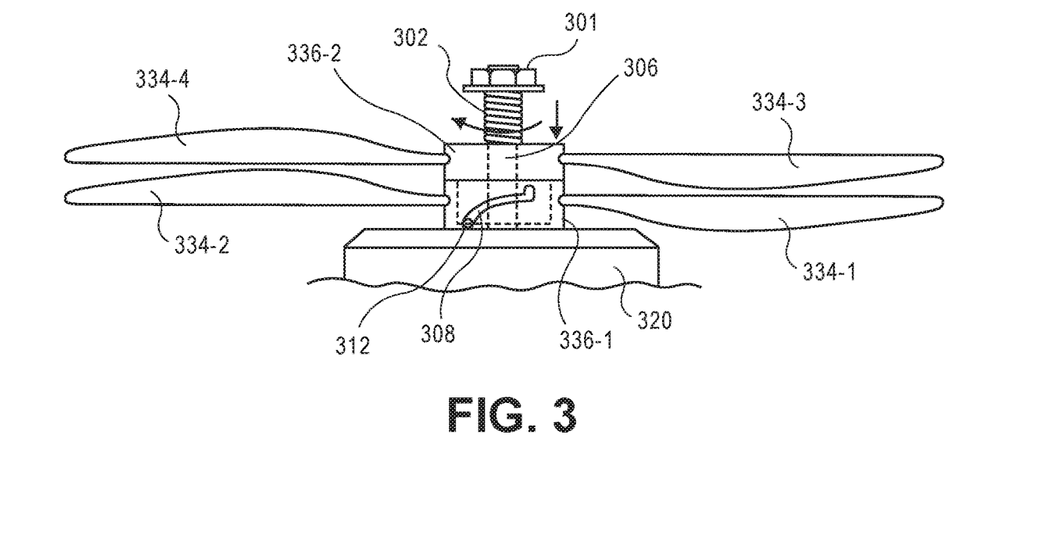

FIG. 2 illustrates a side view of a propeller 230 that is adjustable between a collapsed or coaligned position (as illustrated in FIG. 3) and a deployed or operable position, as illustrated in FIG. 2, in accordance with disclosed implementations. As illustrated, the first blade 234-1 and the second blade 234-2 are coupled to a first hub 236-1 of the propeller. The first hub 236-1 is coupled to the shaft 206 of the motor 220 and rotates with a rotation of the motor 220. One or more grooves, tracks, slides, or other form of guides 208 are included in the interior of the hub 236-1 and configured to receive a pin or other protrusion 212 extending from the second hub 236-2 to guide a positioning of the second hub as it rotates under forces generated by either the rotation of the motor 220 or the spring 202. While the illustrated example only shows a single guide 208, in other implementations there may be two guides 208, three guides, four guides, etc. within the interior of the first hub 208. For example, in some implementations, there may be two guides 208 on opposing or opposite sides of the first hub 208. In other implementations, there may be four guides equally distanced about the first hub 208.

An upper portion of the first hub 236-1 that includes the one or more guides 208 may be substantially hollow and configured to receive a lower portion 236-2A of the second hub 236-2 as the second hub is mated with the first hub 236-1. The lower portion of the first hub 236-1 may be substantially solid to provide stability to the blades 234-1 and 234-2 and to affix the first hub 236-1 to the shaft 206. In other implementations, the blades 234-1 and 234-2 and/or the first hub 236-1 may be mounted or bolted directly to the motor such that they are rotated by the rotation of the motor.

The third blade and fourth blade 234-4 are affixed to the upper portion 236-2B of the second hub that is mated within the first hub 236-1. The lower portion 236-2A of the second hub 236-2 is mated or fit within the substantially hollow portion of the first hub 236-1 and one or more pins 212 or other extensions may protrude outward from the side of the lower portion 236-2A and fit within the respective guide 208 to limit or control an amount of rotation of the second hub 236-2 with respect to the first hub 236-1. The second hub 236-2 may not be coupled to the shaft 206 and may be freely rotatable with respect to the shaft 206. The guides 208 and pins 212 may limit the rotation of the second hub 236-2 with respect to the first hub 236-1 and cause the rotation of the second hub 236-2 when the first hub 236-1 is rotated by the shaft 206 of the motor 220. Likewise, a spring 202 on the shaft 206 atop the second hub 236-2 is secured with a propeller nut 201 or other securing mechanism. The spring provides a downward force against the second hub 236-2.

Referring to FIG. 3, when the motor 320 is not rotating, the spring 302 provides a downward force on the second hub 336-2 that causes the second hub 336-2 to move downward and the pins 312 and guides 308 cause the second hub 336-2 to rotate with respect to the first hub 336-1 so that the third blade 334-3 becomes coaxially aligned or stacked above the first blade 334-1 and the fourth blade 334-4 becomes coaxially aligned or stacked above the second blade 334-2. In comparison, returning again to FIG. 2, when the motor 220 rotates, it causes the first hub 236-1, which is coupled to the shaft 206 of the motor 220 to rotate, which in turn causes the second hub 236-2, which is mated with the first hub 236-1, to rotate. As the first hub 236-1 and the second hub 236-2 rotate, lifting forces are generated by the first blade 234-1, the second blade 234-2, the third blade 234-3, and the fourth blade 234-4. As the rotation increases, the lifting forces generated by the rotation of the third blade 234-3 and the fourth blade 234-4 exceed the downward force of the spring 202 and cause the second hub 236-2 to move upward. Likewise, as the second hub moves upward, the guide 208 and pin 212 cause the second hub 236-2 to rotate with respect to the first hub 236-1 so that the third blade and the fourth blade 234-4 deploy and move to an open or deployed position, as illustrated in FIG. 2. In this example, the guide 208 is shaped to cause the second hub 236-2 to rotate approximately ninety degrees with respect to the first hub so that the third blade and the fourth blade 234-4 are either in a coaligned or stacked position with respect to first blade 234-1 and second blade 234-2, or in a deployed or open position with respect to the first blade 234-1 and second blade 234-2.

The various components of the propeller 230 may be formed from any suitable materials that may be selected based on an amount of lift that may be desired in accordance with the present disclosure. In some implementations, aspects of one or more of the blades 234 and/or one or more of the hubs 236 may be formed from one or more plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the aspects of the blades 234 and/or hubs 236 may be formed of one or more lightweight materials including but not limited to carbon fiber, graphite, machined aluminum, titanium, fiberglass, wood or plastic. Furthermore, in some implementations, the various components of the propeller 230 may be formed by modifying a standard propeller of any type, size, shape or form.

Additionally, the various components of the propeller 230 may be solid or substantially solid, and formed from one or more homogenous or heterogeneous materials. Alternatively, the various components of the propeller 230 may be substantially hollow, e.g., with a solid skin defining an airfoil having a hollow cavity therein, with one or more internal supports or structural features for maintaining a shape of the airfoil. For example, the propeller 230 or portions thereof may be formed from durable frames of stainless steel, carbon fibers, or other similarly lightweight, rigid materials and reinforced with radially aligned fiber tubes or struts. Utilizing a propeller 230 having a substantially hollow cross-section thereby reduces the mass of the propeller 230, and enables wiring, cables and other conductors or connectors to be passed therethrough, and in communication with one or more other control systems components or features. The propeller 230 or such portions thereof may further be filled with foam or other fillers, strengthened with walls or other supports, and covered with flexible skins for resisting moisture, erosion or any other adverse effects of the elements.

Figure 4:
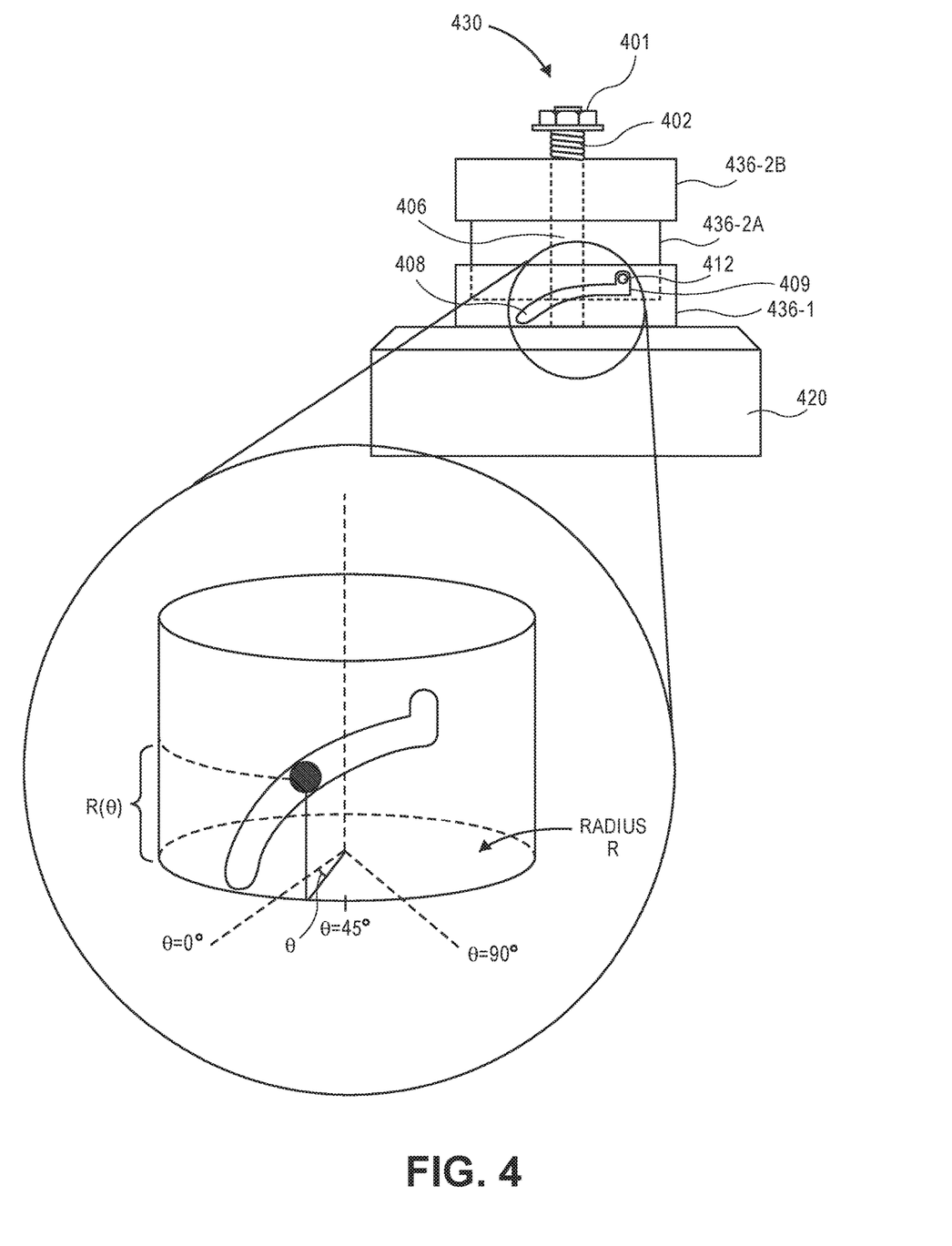
FIG. 4 is a detail side view of a propeller hub, in accordance with implementations of the present disclosure.

FIG. 4 illustrated a detailed side view of the propeller 430, in accordance with disclosed implementations. For purposes of discussion, the blades of the propeller are not illustrated in FIG. 4. As illustrated, the first hub 436-1 is coupled to and rotated by the shaft 406 of the motor 420. The second hub 436-2 includes an upper portion 436-2B to which blades are coupled and a lower portion 436-2A that fits within and mates with a hollow portion of the first hub 436-1 and one or more pins 412 or other protrusions extend from the lower portion 436-2A of the second hub 436-2 and mate or fit within the guide(s) 408 of the first hub 436-1. Likewise, a spring 402 is fitted around the shaft 406 and secured with a propeller nut 401 such that the spring 402 applies a downward force on the second hub 436-2.

In some implementations, the guide 408 may include a deployment notch 409 that receives the pin or other protrusion 412 when the second hub 436-2 is in the deployed position. Positioning the protrusion 412 in the notch when the second hub 436-2 is in the deployed position, will maintain the second hub and coupled blade in the deployed position even under varying lifting forces and stabilize the balance of the propeller. The deployment notch 409 provides inertia to keep the propeller in a deployed position so that the pin will not move along the guide in response to small variations of RPM of the motor.

The shape or curvature of the guide 408 may be determined by the downward forces generated by the spring 402 and the upward lifting forces generated by the blades that are coupled to the second hub 436-2 when the second hub is rotating. When the motor 420 is not rotating the propeller 430, the downward force of the spring 402 causes the pin 412 to move downward along the guide 408 and rotate the second hub and corresponding blades into a coaligned or stacked position with respect to the first hub 436-1 and blades coupled to the first hub. The spring coefficient and the length of the spring may be determined by specifying a minimum lifting force generated by the blades coupled to the second hub 436-2 when the second hub begins rotating. Specifically, based on the shape of the blades and a minimum RPM, a minimum lifting force ($T_{min}$) generated by rotation of the blades that is needed to deploy the blades may be determined. Likewise, the spring coefficient (k) may be computed as:

$$k = \frac{T_{min}}{H + l_0}$$

where H is the total displacement or height between the base of the guide and the top of the guide (i.e., the amount the spring will compress/decompress with a movement of the second hub) and $l_0$ is the length of the spring when extended and the second hub 436-2 is in the coaligned or stacked position. In turn, the spring bias force $F_{S,0}$ equals:

$$F_{S,0} = kl_0$$

By setting the spring coefficient and the length of the spring according to the above equation, when the upward lifting force generated by the blades coupled to the second hub 436-2 exceeds the minimum lifting force, the second hub 436-2 will move upward and the pin 412 will move along the guide rotating the second hub 436-2 with respect to the first hub 436-1.

As the spring compresses, the downward force applied by spring increases. Referring to the expanded view illustrated in FIG. 4, to account for this change in downward force applied by the spring, the guide 408 may be curved. In order to have a constant torque M over a hub radius of R being applied to the upper propeller pair and assuming that the curvature of the guide is much smaller than the curvature of the hub, the equation describing the shape of the guide $h(\theta)$ is given by:

$$h(\theta) = (\sqrt{F_{S,0}^2 + 2kM\theta} - F_{S,0})$$

The spring bias force equals:

$$F_{S,0} = \frac{M\pi - kH_0^2}{2H_0}$$

The above examples illustrate a four-blade propeller that may be adjusted between a coaligned or stacked position and a deployed or normal operating position. Such a configuration is beneficial as it allows the propeller blades to be coaligned or stacked so that the blades of the propeller may be oriented parallel with the direction of travel, thereby reducing drag from the propeller blades when the propeller blades are not in operation. Likewise, by using four propeller blades, a similar lifting force generated by the propeller may be achieved at a lower RPM compared to a two-blade propeller. Operating at a lower RPM changes the sound profile of the propeller, which may be lower and/or at a more suitable frequency for human perception.

Figure 5A:
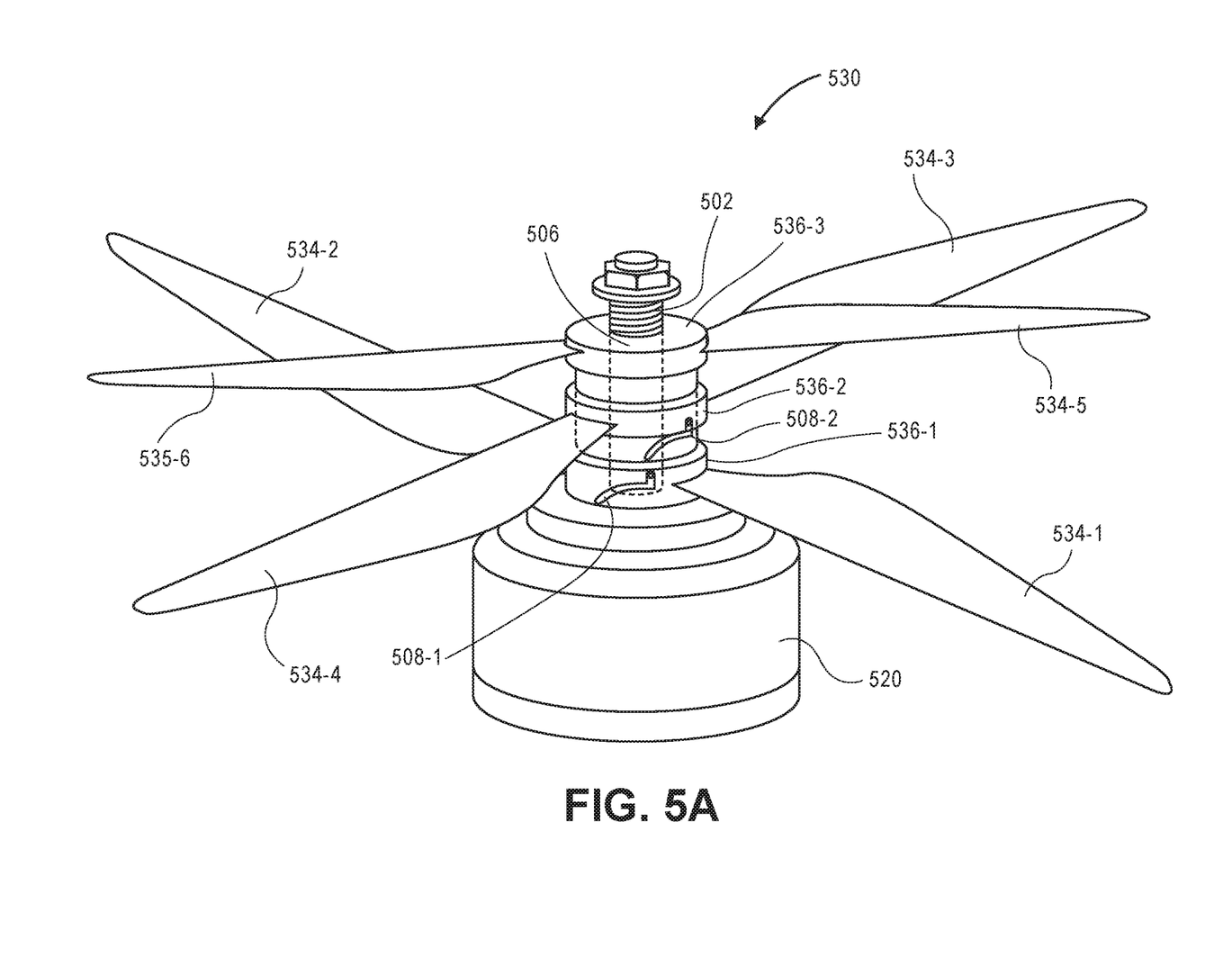
FIGS. 5A through 5B are views of aspects of a six-blade propeller, in accordance with implementations of the present disclosure.

While the above example illustrates a four-blade propeller with two stacked hubs, in other implementations, additional hubs and/or blades may be utilized. For example, FIG. 5A illustrates a propeller 530 with three hubs 536-1, 536-2, and 536-3 and six blades 534-1, 534-2, 534-3, 534-5, and 534-6. In this example, the first blade 534-1 and the second blade 534-2 are coupled to and on opposing sides of the first hub 536-1. The third blade 534-3 and fourth blade 534-4 are on opposing sides and coupled to the second hub 536-2. The fifth blade 534-5 and the sixth blade 534-6 are on opposing sides and coupled to the third hub 536-3.

Likewise, the first hub 536-1 is coupled to and rotated by the shaft 506 of the motor 520, includes a portion that is substantially hollow and has a guide 508-1 along the interior that is configured to receive a pin from the second hub to control the rotation of the second hub 536-2. The second hub 536-2 has a lower portion that is mated or fit into the upper hollow portion of the first hub 536-1 and a pin or other protrusion that fits within the guide 508-1. Likewise, in this example, the shape and length of the guide 508-1 is such that when the second hub 536-2 is in the deployed or normal operating position it rotates approximately sixty degrees with respect to the first hub 536-1 so that the fourth blade 534-3 is approximately sixty degrees out of vertical alignment with respect to the first blade 534-1 and the fourth blade 534-4 is approximately sixty degrees out of vertical alignment with respect to the second blade 534-2. When the motor 520 is not rotating and the downward force from the spring 502 causes the second hub 536-2 to rotate to the coaligned or stacked position, the second hub rotates approximately sixty degrees with respect to the first hub so that the first blade 534-1 and the third blade 534-3 are coaligned or vertically stacked and the second blade 534-2 and the fourth blade 534-4 are coaligned or stacked.

In this example, the upper portion of the second hub may be substantially hollow, configured to receive a lower portion of a third hub 536-3, and include a guide 508-2 that mates with a pin of the third hub 536-3 and controls the position and rotation of the third hub 536-3 with respect to the second hub 536-2. The third hub 536-3 has a lower portion that is mated or fit into the upper hollow portion of the second hub 536-2 and a pin or other protrusion that fits within the guide 508-2 of the second hub 236-2. Likewise, in this example, the shape and length of the guide 508-2 is such that when the third hub 536-3 is in the deployed or normal operating position, it rotates approximately sixty degrees with respect to the second hub 536-2 so that the fifth blade 534-5 is approximately sixty degrees out of vertical alignment with respect to the third blade 534-3 and the sixth blade 534-6 is approximately sixty degrees out of vertical alignment with respect to the fourth blade 534-4. When the motor 520 is not rotating and the downward force from the spring 502 causes the third hub 536-3 to rotate to the coaligned or stacked position, the third hub rotates approximately sixty degrees with respect to the second hub, and approximately one-hundred and twenty degrees with respect to the first hub, so that the first blade 534-1, the third blade 534-3, and the fifth blade 534-5 are coaligned or vertically stacked and the second blade 534-2, the fourth blade 534-4, and the sixth blade 534-6 are coaligned or stacked.

Figure 5B:
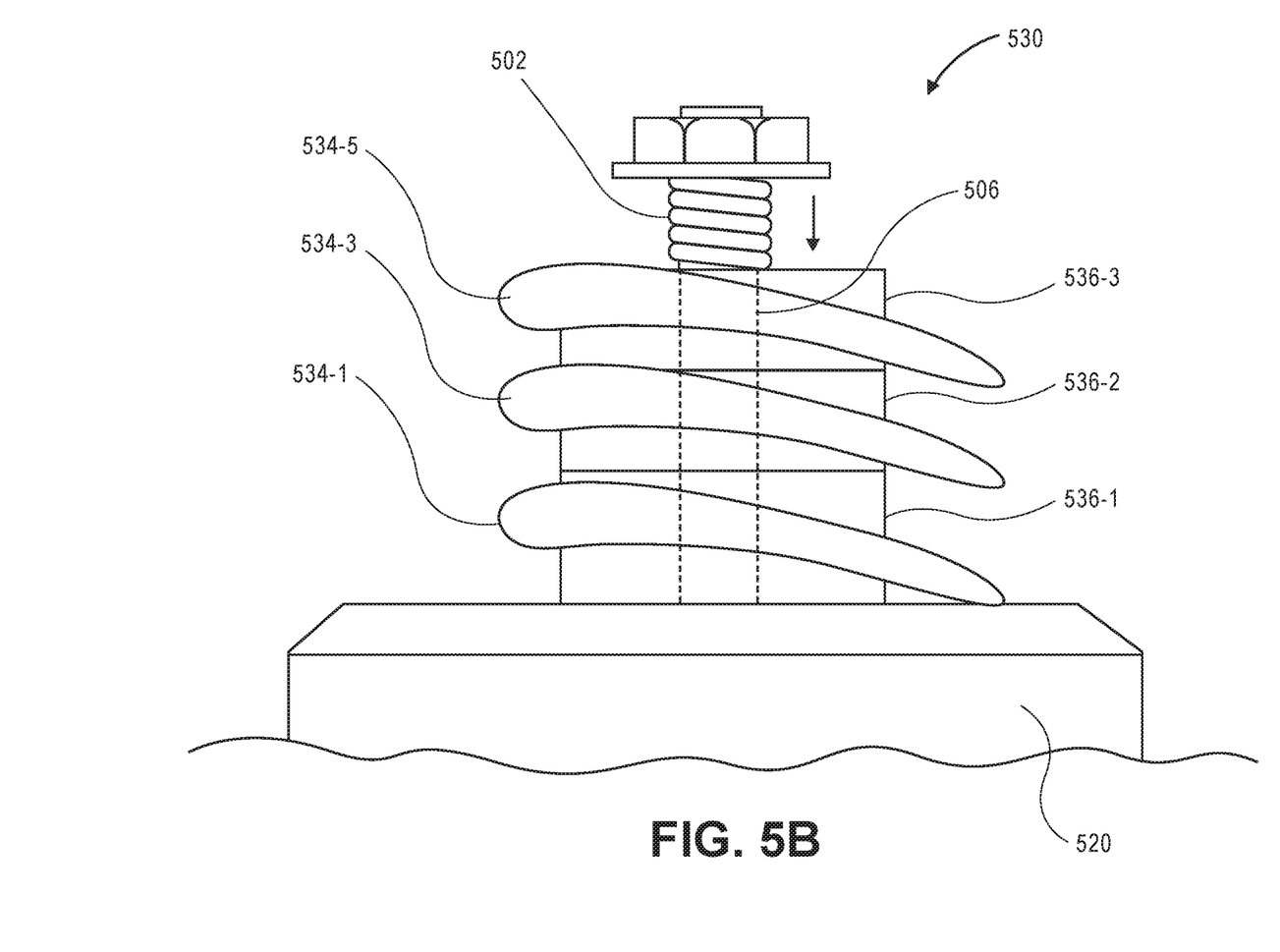

Referring to FIG. 5B, illustrated is a side view of the propeller 530 of FIG. 5A in the coaligned or stacked position that occurs when the motor 520 is not rotating the shaft 506, in accordance with disclosed implementations. As illustrated, the second hub 536-2 and third hub 536-3 have rotated under the downward force of the spring 502 and rotated so the third blade 534-3 and the fifth blade 534-5 are aligned with the first blade 534-1 that is coupled to the first hub 536-1. As discussed above, and as illustrated in FIG. 1D, when the propeller 530 is not rotating, for example when the aerial vehicle is in forward flight, the propeller blades may be oriented so that the coaligned or stacked blades 534 are parallel to the direction of travel of the vehicle, thereby reducing drag generated by the blades.

Figure 6A:
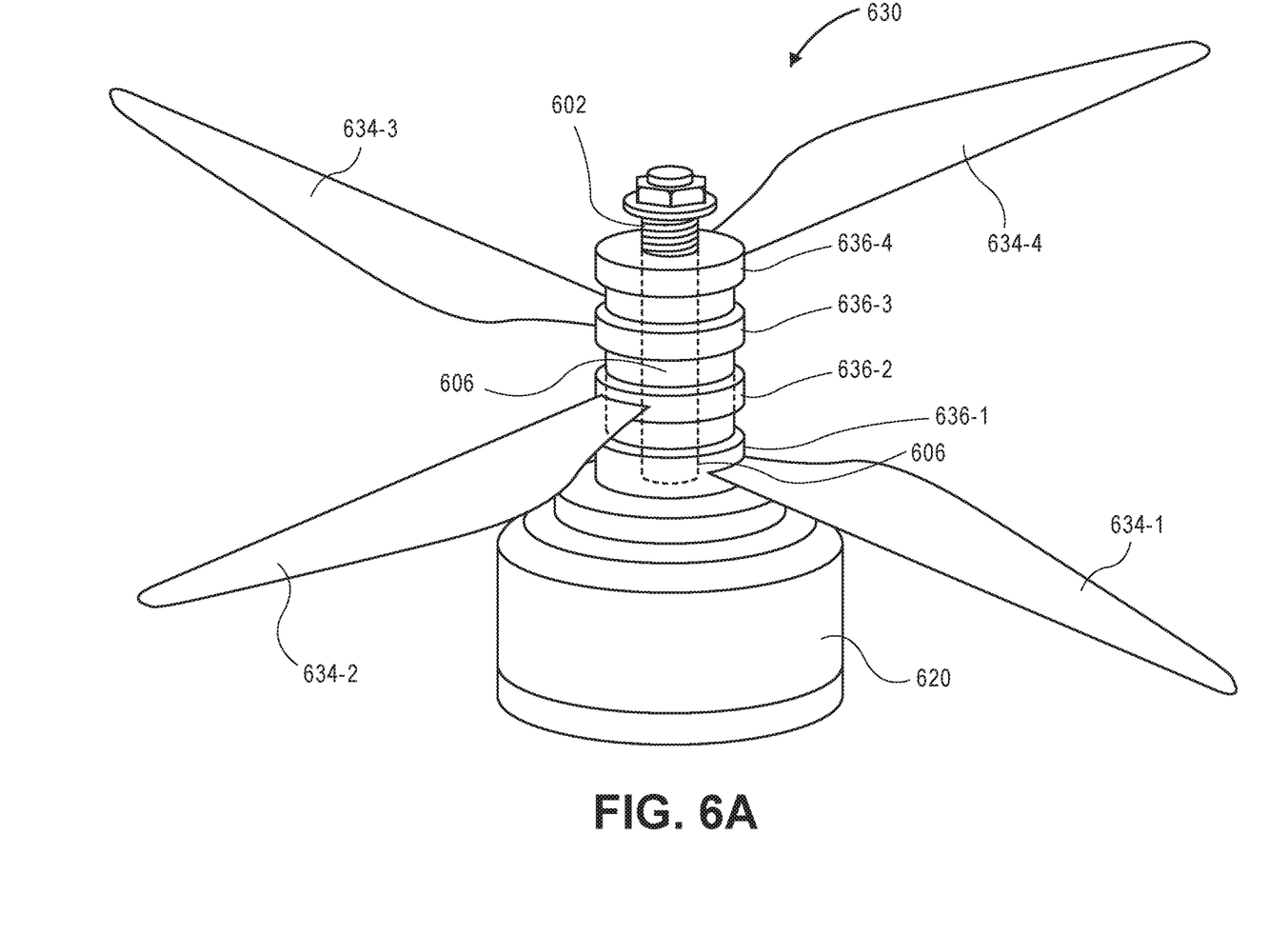
FIGS. 6A through 6B are views of aspects of a four-blade propeller, in accordance with implementations of the present disclosure.

FIG. 6A illustrates an example of a propeller with four hubs 636-1, 636-2, 636-3, and 636-4, three of which may rotate with respect to the first hub 636-1, in accordance with disclosed implementations. As with the other examples, the first hub 636-1 may be coupled to the shaft 606 of the motor 620 and rotated by the motor 620. Likewise, the guide and pins cause the other hubs and blades to rotate when the motor rotates the first hub 636-1.

However, in this example, there is only one blade coupled to each hub to form a four-blade propeller. For example, a first blade 634-1 may be coupled to the first hub 636-1, a second blade 634-2 may be coupled to the second hub 636-2, a third blade 634-3 may be coupled to the third hub 636-3, and a fourth blade 634-4 may be coupled to the fourth hub 636-4. The guides of each of the first hub 636-1, second hub 636-2, and third hub 636-3 may be configured to allow the pin of the respectively coupled hub to rotate approximately ninety degrees between a coaligned or stacked position in response to a downward force from the spring 602, illustrated as a side view of FIG. 6B, and a deployed or normal operating position, as illustrated in FIG. 6A.

Like the other examples, an upper portion of the hubs 636 may be substantially hollow and include a guide that mates with and receives a pin extended from a perimeter of an upper adjacent hub to control rotation of that hub. With a single blade on each hub and configuring the guides to allow the adjacent hub to rotate approximately ninety degrees, when the motor 620 is rotating the shaft 606, the lifting forces generated by the blades 634 exceed the downward force generated by the spring 602 causing the hubs to move upward and rotate. When the hubs 636 and blades 634 are in the illustrated deployed or open position, the blades are equally spaced about the shaft 606 in approximately ninety-degree increments.

Figure 6B:
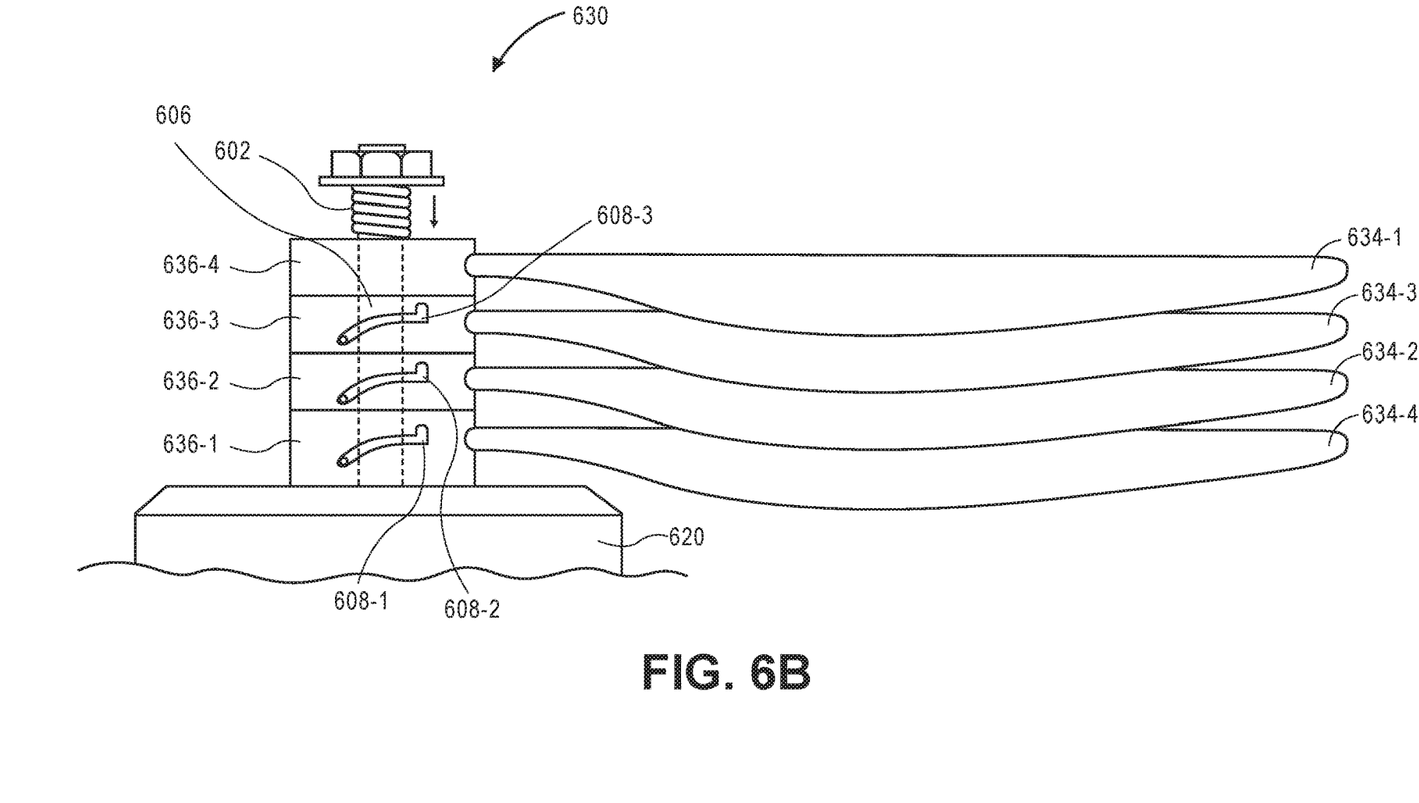

In comparison and referring to FIG. 6B, when the motor 620 is not rotating, the downward force from the spring 602 pushes the hubs 636-2, 636-3, and 636-4 downward and the respective pins move along the guides 608-1, 608-2, and 608-3 causing the hubs to rotate into the coaligned or stacked position such that each of the blades 634-1, 634-2, 634-3, and 634-4 are coaligned or stacked, as illustrated. For example, the pin of second hub 636-2 that is positioned within the guide 608-1 of the first hub causes the second hub 636-2 to rotate with respect to the first hub 636-1, which is affixed to the shaft 606 of the motor 620, approximately ninety degrees such that the second blade 634-2 coupled to the second hub 636-2 is coaligned or stacked above the first blade 634-1 that is coupled to the first hub 636-1. The pin of third hub 636-3 that is positioned within the guide 608-2 of the second hub causes the third hub 636-3 to rotate with respect to the second hub 636-2 approximately ninety degrees such that the third blade 634-3 coupled to the third hub 636-3 is coaligned or stacked above the second blade 634-2 and the first blade 634-1. The pin of fourth hub 636-4 that is positioned within the guide 608-3 of the third hub causes the fourth hub 636-4 to rotate with respect to the third hub 636-3 approximately ninety degrees such that the fourth blade 634-4 coupled to the fourth hub 636-4 is coaligned or stacked above the third blade 634-3, the second blade 634-2, and the first blade 634-1.

In the example configuration illustrated with respect to FIGS. 6A and 6B, the wind passing over the vehicle when the vehicle is traveling in a substantially horizontal direction can be used to align the blades of the propeller 630 in a direction parallel to travel by allowing the motor 620 for freely spin. Specifically, the force of the wind will cause the blades 634 to orient parallel and away from the direction of travel, thereby reducing drag generated by the blades 634 of the propeller 630.

The above examples illustrate that any configuration and combination of blades and/or propellers may be utilized. For example, any number of hubs may be stacked and mated along the length of a shaft of a motor and a spring may be used to cause the hubs to compress and rotate into a coaligned or stacked position such that the propeller blades of the hubs can be oriented parallel with a direction of travel, thereby reducing drag caused by the propeller when the propeller is not operational. Likewise, when the motor is rotated such that the minimum thrust is generated by each of the lifting forces exceeds the downward force of the spring, allows the hubs to move upward and rotate such that the blades of the propeller are deployed around the shaft into the deployed or normal operating position to provide lifting forces to the aerial vehicle.

Figure 7A:
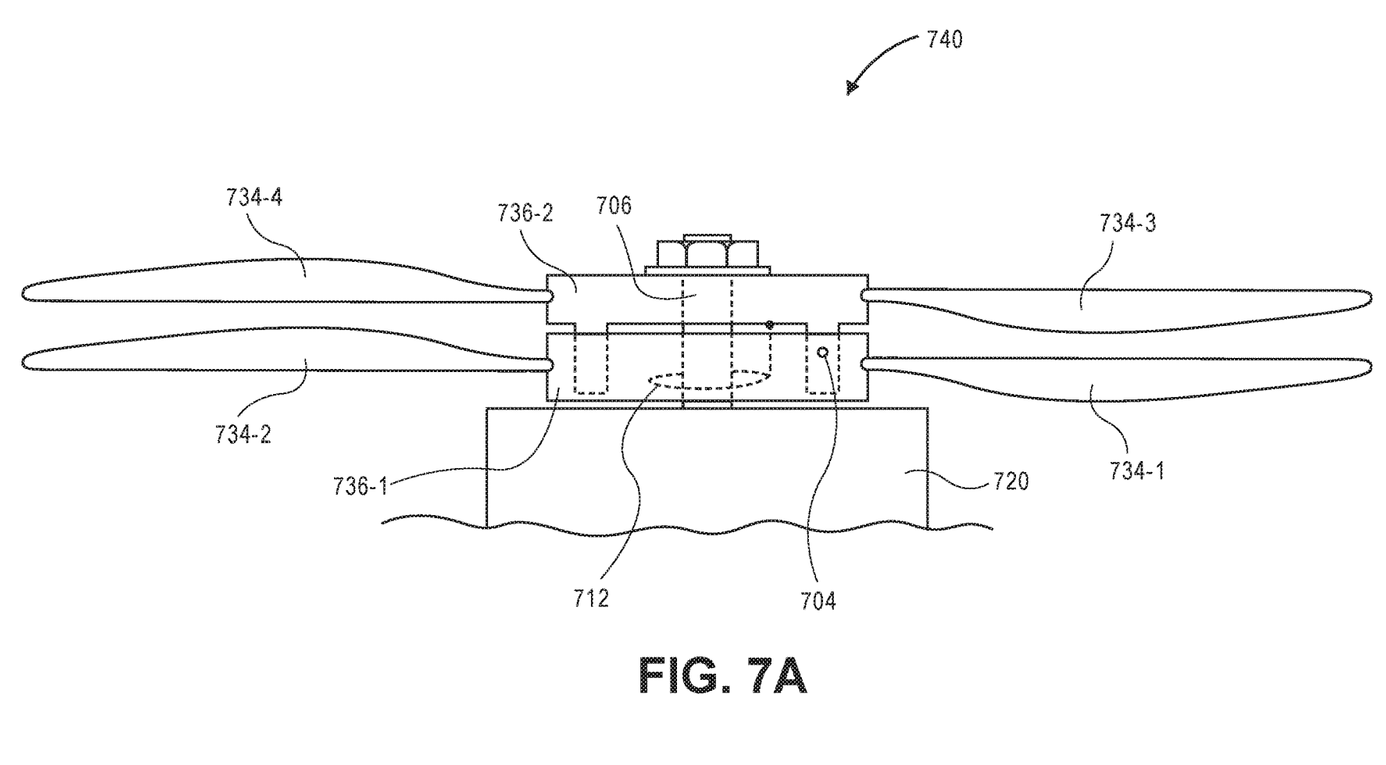
FIGS. 7A through 7B are views of aspects of another four-blade propeller, in accordance with implementations of the present disclosure.

FIG. 7A illustrates a side view of another propeller 740 in which the blades of the propeller are rotatable between a coaligned or stacked position, as illustrated in FIG. 7A, and a deployed or normal operating position, in accordance with described implementations. In comparison to the discussions above that utilize a spring at the end of the shaft that provides a downward force on the hubs, in this example, a torsion spring 712 is positioned within the interior of the first hub 736-1. The first hub 736-1 is coupled to the shaft 706 and rotates with the shaft when the shaft is rotated by the motor 720. The second hub 736-2 is mated to the first hub 736-1 and rotatable about the shaft with respect to the first hub 736-1.

Figure 7B:
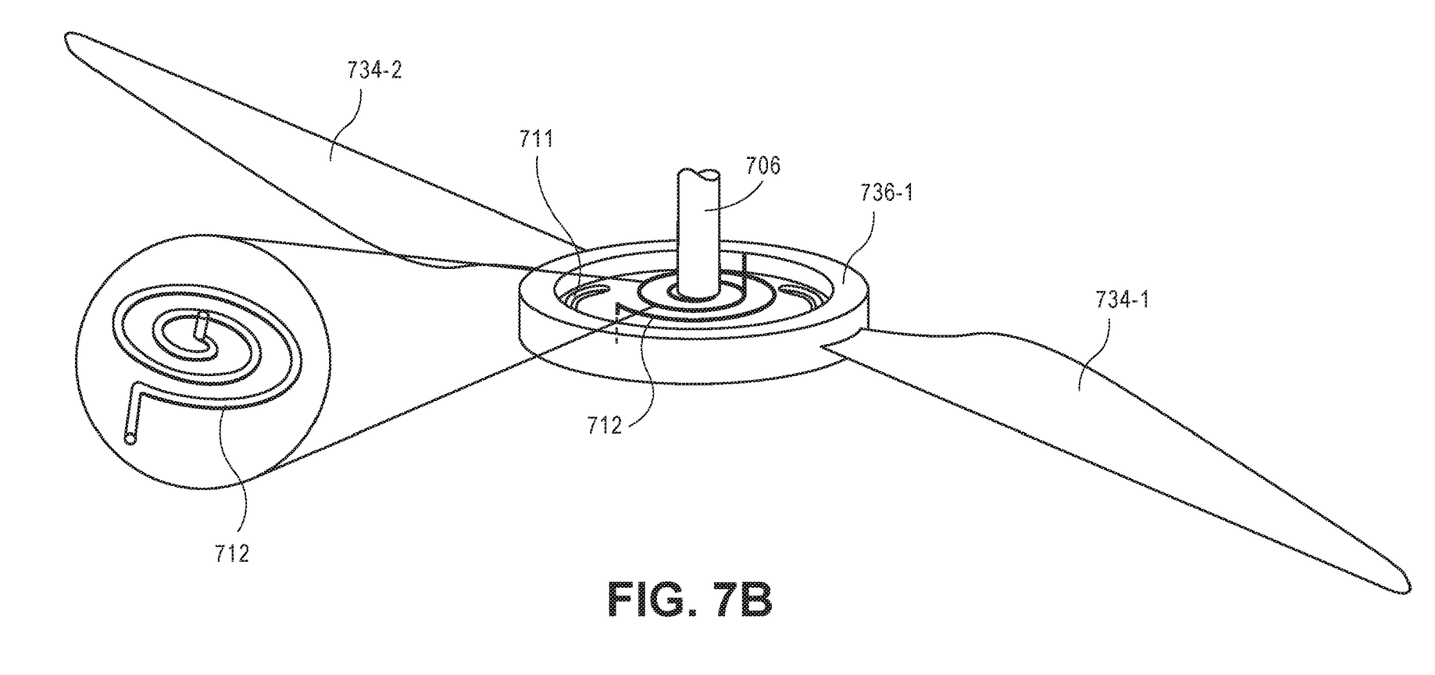

The torsion spring 712 is affixed to the first hub and the second hub such that it will position the second hub 736-2 in a coaligned or stacked position with respect to the first hub 736-1 when the motor 720 is not rotating the propeller 740. As discussed above, when the first hub and the second hub are coaligned, the blades 734 are coaligned and may be oriented parallel to a direction of travel or into the wind, thereby reducing drag. In this example, when the second hub 736-2 is coaligned with the first hub 736-1, the first blade 734-1 that is coupled to the first hub 736-1 and the third blade 734-3 that is coupled to the second hub 736-2 are coaligned and vertically stacked. Likewise, the second blade 734-2 that is coupled to the first hub 736-1 and the fourth blade 734-4 that is coupled to the second hub 736-2 are coaligned and vertically stacked. A pin 704 may be included that mates with the guide 711 (FIG. 7B) to limit rotation of the second hub 736-2 with respect to the first hub 736-1.

when the motor 720 is rotating, the torque on the propeller blades due to the rotation exceeds the force of the torsion spring 712 and the second hub 736-2 rotates with respect to the first hub. as the second hub rotates the pin 704 moves along the guide 711 until it reaches the end of the guide and rotation of the second hub is stopped by the pin meeting the end of the guide 711. In this example, the guide 711 and pin 704 allow the second hub 736-2 to rotate approximately ninety degrees with respect to the first hub so that the blades 734 are approximately equally spaced about the perimeter of the shaft 706.

Although the disclosure has been described herein using exemplary techniques, components, and/or processes for implementing the systems, apparatus, and methods of the present disclosure, it should be understood by those skilled in the art that other techniques, components, and/or processes or other combinations and sequences of the techniques, components, and/or processes described herein may be used or performed to achieve the same function(s) and/or result(s) described herein and which are included within the scope of the present disclosure.

For example, although some of the implementations disclosed herein reference the use of propellers having pivotable and fixed blades provided aboard unmanned aerial vehicles, those of ordinary skill in the pertinent arts will recognize that uses of four or more propellers disclosed herein are not so limited, and may be utilized in connection with any type or form of aerial vehicle (e.g., manned or unmanned) where the use of such propellers is desired for less than an entire duration of flight or related operations.

Moreover, although some of the implementations disclosed herein depict the use of propellers having four blades, such as is shown in FIGS. 1A through FIG. 4 and FIG. 6A through FIG. 7A, or six blades, such as is shown in FIG.

5A-FIG. 5B, the systems, apparatus, and methods of the present disclosure are likewise not so limited. Rather, the systems, apparatus, and methods of the present disclosure may be utilized in connection with propellers having any number of blades, and any portion of such blades may be fixed or pivotable in nature.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An unmanned aerial vehicle comprising:
a frame;
a motor mounted to the frame, wherein the motor comprises a shaft;
a first hub positioned on the shaft and including:
a first blade joined to the first hub;
a second blade joined to the first hub; and
a guide;
wherein the first hub is coupled to the shaft or the motor and rotates with a rotation of the shaft and the motor;
a second hub positioned along the shaft and including:
a third blade joined to the second hub;
a fourth blade joined to the second hub; and
a protrusion extending from the second hub and mating with the guide of the first hub such that a rotation of the second hub with respect to the first hub is limited by the guide and the rotation of the first hub causes a rotation of the second hub; and
a spring positioned to apply a first force to at least one of the first hub or the second hub, wherein:
when the motor is not rotating, the first force causes the second hub to align with the first hub such that the third blade and fourth blade of the second hub are coaxially aligned with the first blade and the second blade; and
when the motor is rotating, a lifting force produced by a rotation of the third blade and the fourth blade causes the second hub to rotate with respect to the first hub such that the third blade and the fourth blade are not coaxially aligned with the first blade and the second blade.

2. The unmanned aerial vehicle of claim 1, wherein:
the first hub includes a substantially hollow upper portion; and
the guide is aligned along an interior of the substantially hollow upper portion.

3. The unmanned aerial vehicle of claim 2, wherein:
the second hub includes a lower portion positionable inside the substantially hollow upper portion of the first hub.

4. The unmanned aerial vehicle of claim 1, wherein the guide allows the second hub to rotate approximately ninety degrees with respect to the first hub such that when the motor is rotating the first blade, the second blade, the third blade, and the fourth blade are approximately equally spaced about a perimeter of the shaft.

5. The unmanned aerial vehicle of claim 1, wherein the guide has a curved shape based at least in part on a change in the first force applied by the spring as the second hub rotates with respect to the first hub.

6. A propeller apparatus, comprising:
a first hub;
a first blade coupled to the first hub;
a second hub pivotally coupled to the first hub;
a second blade coupled to the second hub; and
a spring applying a first force to at least one of the first hub or the second hub;
wherein:
the second hub is pivotable with respect to the first hub between:
a coaligned position in which the first blade and the second blade are coaligned and vertically stacked and the first force is greater than a second force resulting from a rotation of the first hub; and a deployed position in which the first blade and the second blade are not coaligned and the first force is less than the second force.

7. The propeller apparatus of claim 6, further comprising:
a third blade coupled to the first hub; and
a fourth blade coupled to the second hub;
wherein:
the third blade and the fourth blade are coaligned and stacked when the second hub is in the coaligned position; and
the third blade and the fourth blade are not coaligned when the second hub is in the deployed position.

8. The propeller apparatus of claim 6, further comprising:
a shaft;
a propeller nut positioned on an end of the shaft; and
wherein the spring is positioned between an upper portion of the second hub and the propeller nut.

9. The propeller apparatus of claim 8, wherein:
the spring is in an extended position and applying a downward force on the second hub when the second hub is in the coaligned position; and
the spring is in a contracted position when the second hub is in the deployed position.

10. The propeller apparatus of claim 9, wherein:
the spring moves between the extended position and the contracted position when a lifting force generated at least in part by the second blade exceeds the downward force and the second hub rotates between the coaligned position and the deployed position.

11. An apparatus comprising:
a first hub operable to engage and be coupled with at least one of a shaft of a motor or the motor;
a second hub pivotably coupled to the first hub and operable to pivot with respect to the first hub between a coaligned position and a deployed position in response to a rotation of the first hub;
a first blade coupled to the first hub; and
a second blade coupled to the second hub;
wherein:
the second hub rotates when the first hub is rotated;
the second blade generates a lifting force when the second hub rotates;
the lifting force causes the second hub to rotate into the deployed position; and
the first blade is separated from the second blade when the second hub is in the deployed position.

12. The apparatus of claim 11, wherein the first blade and the second blade are coaligned and vertically stacked when the second hub is in the coaligned position.

13. The apparatus of claim 11, further comprising:
a guide incorporated into the first hub; and
a protrusion extending from the second hub and positioned within the guide; and
wherein the guide limits an amount of pivot of the second hub with respect to the first hub.

14. The apparatus of claim 13, further comprising:
a deployment notch positioned at a first end of the guide, wherein the deployment notch receives the protrusion when the second hub is in the deployed position.

15. The apparatus of claim 11, further comprising:
a spring configured to cause the second hub to be positioned in the coaligned position when the shaft is not rotating the first hub.

16. The propeller apparatus of claim 6, wherein:
the first hub includes a guide; and
the second hub includes a protrusion positioned within the guide.

17. The propeller apparatus of claim 16, wherein the guide is configured to define the coaligned position and the deployed position of the second hub.

18. The propeller apparatus of claim 16, wherein the protrusion is configured to move between a first end of the guide and a second end of the guide.

19. The propeller apparatus of claim 18, wherein the first end of the guide is associated with the deployed position of the second hub, and the second end of the guide is associated with the coaligned position of the second hub.

20. The propeller apparatus of claim 16, wherein:
the first hub includes a substantially hollow upper portion;
the guide is aligned along an interior of the substantially hollow upper portion of the first hub;
the second hub includes a lower portion positionable inside the substantially hollow upper portion of the first hub; and
the protrusion is located along an exterior of the lower portion of the second hub.

* * * * *